United States Patent [19]
Biggs et al.

[11] 3,782,833
[45] Jan. 1, 1974

[54] METHOD AND APPARATUS FOR MEASURING AREA

[75] Inventors: William W. Biggs; Max D. Clegg, both of Lincoln, Nebr.

[73] Assignee: Lambda Instruments Co., Lincoln, Nebr.

[22] Filed: May 25, 1972

[21] Appl. No.: 256,921

[52] U.S. Cl. ... 356/158, 250/219 WG, 250/219 GG, 356/157
[51] Int. Cl. ............................................. G01b 11/28
[58] Field of Search .................. 356/157, 158, 159, 356/160; 250/219 WD, 219 LG

[56] References Cited
UNITED STATES PATENTS

| | | | |
|---|---|---|---|
| 2,910,908 | 11/1959 | Meyer, Jr. | 356/158 |
| 3,513,444 | 5/1970 | Henderson et al. | 356/157 |
| 2,447,024 | 8/1948 | Metcalf | 356/158 |
| 2,184,156 | 12/1939 | Bowles | 356/158 |
| 3,710,084 | 1/1973 | Slagley et al. | 250/219 LG |
| 2,719,236 | 9/1955 | Soltis | 356/157 |
| 3,222,979 | 12/1965 | Webster | 250/219 WD |
| 3,717,414 | 2/1973 | Hall et al. | 250/219 WD |
| 3,698,818 | 10/1972 | Bowker et al. | 356/160 |
| 3,515,487 | 6/1970 | Hatcher, Jr. et al. | 356/157 |

*Primary Examiner*—John K. Corbin
*Assistant Examiner*—V. P. McGraw
*Attorney*—Vincent L. Carney

[57] ABSTRACT

To nondestructively measure the area of a relatively flat object, a length increment encoder controls the signals generated by a width sensing array as a scanning section containing the width sensing array is moved relative to a fixed reference over the object to be measured in a manner dependent on increments of length moved by the scanner and independent of the velocity of the scanner so that the signals from the width sensing array are integrated with respect to length, with the signals being accumulated in a counter to represent the area of the object. In one embodiment, an optical system provides an image of a line of width on the object being scanned, which image is reduced and projected onto a sensing array to improve the resolution of the area measuring instrument and to reduce its bulk.

16 Claims, 6 Drawing Figures

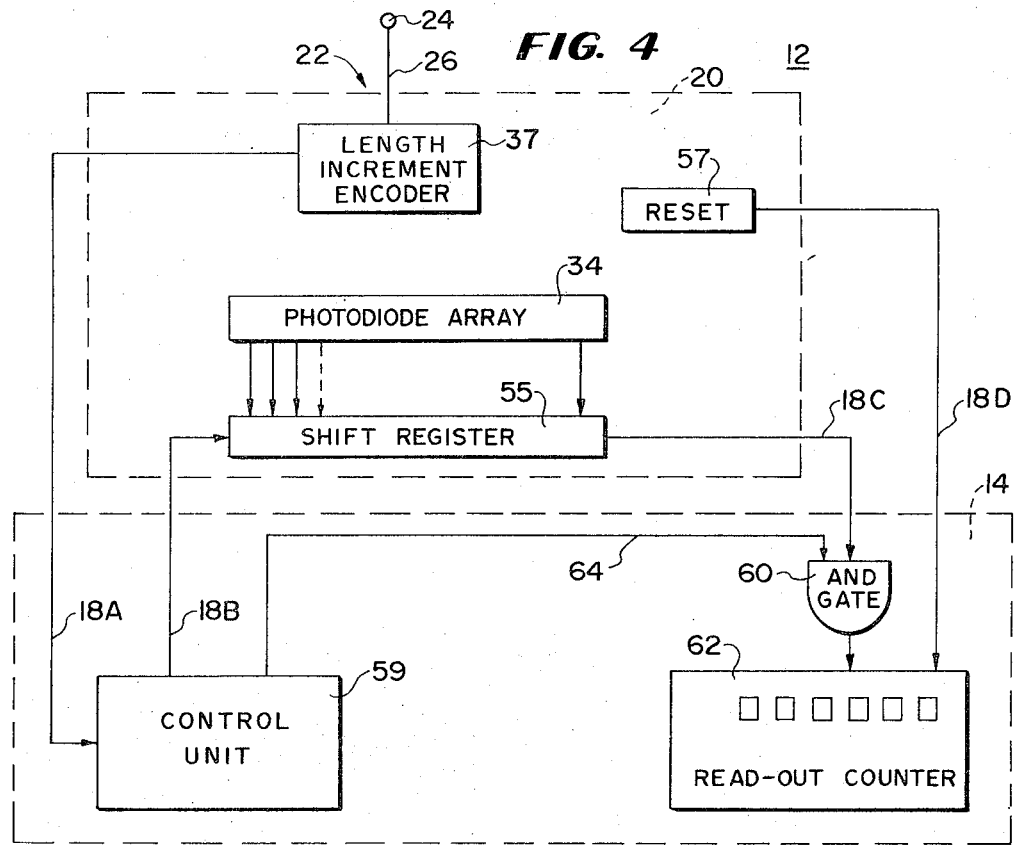
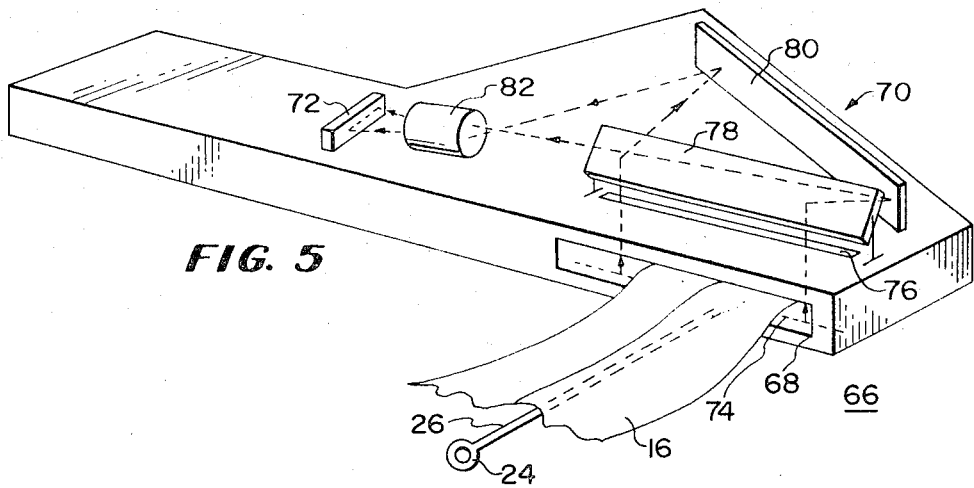

METHOD AND APPARATUS FOR MEASURING AREA

This invention relates to methods and apparatuses for measuring the area of flat objects and more particularly relates to apparatus and methods for measuring the area of flat objects without having to detach the objects from a larger object.

One type of automatic area measuring apparatus measures the length of a flat object such as a leaf and measures the width of the object at different points along its length, using these measurements to form an integral of the width with respect to the length thus obtaining the area of the flat object. In measuring the width and length of the flat object, electric pulses are generated which are proportional in number to the area and these pulses are accumulated to provide a total count representing the area of the flat object.

In one class of prior art automatic area measuring apparatuses of this type, the object to be measured is detached from any portion that is not to be measured. For example if the area of a leaf is to be measured it is pulled free from the stalk and placed on a conveyor. The conveyor moves the object to be measured past a width scanner that scans across the object with a flying spot scanner, generating signals as it scans, while the object is moved at a constant rate by the conveyor so that the signals obtained by scanning the width may be considered as being integrated with respect to time to provide an area measurement for the object. The flying spot is obtained by focusing light from an incandescent lamp into a spot and moving the spot.

The prior art apparatus of this class have several disadvantages such as: (1) they are excessively large and not portable; and (2) they are not suitable for nondestructive measurements.

Firstly, the prior art apparatuses are excessively large because the motors and conveyor system are heavy and occupy a great deal of space. Moreover, the motors and incandescent lamps require considerable power and therefore require bulky sources for the power. The incandescent lamp requires substantial power because it is on continuously and therefore continuously consumes power. Moreover, the flying spot scanner is bulky because it must scan across a large area.

Secondly, the apparatus is not suitable for nondestructive testing because the object to be measured must be moved along a conveyor system through the width measuring apparatus. This requires that it be detached from all other large or stationary objects. For example, a leaf must be pulled free from its stalk or a map having a certain area to be integrated must be cut to separate the area to be measured from the map so that it may be run through the conveyor system for measurement.

Accordingly, it is an object of this invention to provide a novel method and apparatus for measuring area.

It is a further object of this invention to provide a nondestructive measuring method and apparatus for measuring the area of objects.

It is a still further object of the invention to provide a method and apparatus especially suitable for making measurements relating to plant life.

It is a still further object of the invention to provide an area measuring apparatus and method in which a scanning device is moved with respect to a stationary object to measure its area.

It is a still further object of this invention to provide an area measuring apparatus and method in which the length and width of an object are measured with one of the length and width being integrated with respect to the other of the length and width.

It is a still further object of this invention to provide an area measuring method and apparatus which includes an incremental length encoder which generates signals relating to length which are not dependent upon the velocity of motion of the object with respect to the scanner.

It is a still further object of this invention to provide an apparatus and method for measuring an area of an object in which the length measuring device generates synchronizing signals to operate a width measuring device.

It is a still further object of this invention to provide an area measuring apparatus which is small and compact and therefore portable.

It is a still further object of this invention to provide an electrically operated area measuring apparatus which does not require large amounts of power.

It is a still further object of this invention to provide an area measuring apparatus having an optical system to form a reduced size image of at least one portion of an object that is being measured.

It is a still further object of this invention to provide a novel method and apparatus for measuring the area of an object which method and apparatus provides improved resolution.

It is a still further object of the invention to provide an apparatus and method for measuring the area of an object in which the sensing energy is intermittently applied rather than continuously applied.

In accordance with the above, and further objects of the invention, the automatic area measuring apparatus includes a length measuring system and a width measuring system controlled by the length measuring system. The length measuring system operates independently of the speed of measuring length, generating signals relating only to the length of an object that is scanned. The length measuring system also controls the width measuring system, causing the width to be measured at selected increments of length to represent the integral of the width with respect to the length regardless of the rate of scanning.

The length measuring system of the automatic area measuring apparatus includes a tab at one end and a signal generator at the other end. The width measuring system and the signal generator are included within a manually moved scanner that forms a part of the scanning section, with the signal generator: (1) moving a distance within the manually moved scanner that is proportional to the distance that the manually moved scanner moves with respect to the tab during the measurement of the area of the object; and (2) generating a signal at each increment of length that the manually moved scanner moves with respect to the tab.

The width measuring system includes: (1) a scanning area across which the object moves during scanning; (2) a light source which transmits light across the width of the object to be measured and portions of the scanning area on each side of the object, some of which light is blocked by the object and some of which is passed around the object, and (3) an array of photocells which detect the portion of the light that is passed around the object to be measured.

The signals from the length measuring system control the readout from the width measuring system so that the signals are read from the width measuring system each predetermined increment of length of the object to be scanned that is covered by the scanner. With this mechanization the signals read from the array of photocells represent the integral of the width of the object being measured with respect to its length, which is the area of the object scanned.

The signal generator which is a part of the length measuring apparatus includes a chopper wheel having circumferentially spaced apertures, around its periphery. A light source and a photocell are spaced from opposite sides of the chopper wheel, aligned with the circle of apertures and each other, so that a plurality of pulses are generated by the photocell as the apertures rotate between the lamp and the photocell. The chopper wheel is rotated as the cord is pulled by the motion of the scanner with respect to the tab on the end of the cord.

The width measuring apparatus includes a shift register which stores a number of pulses equal to the number of photocells that were covered by the object to be measured and shifts this information into an accumulator at each of the length increments established by the length measuring system.

In one embodiment, an optical system focuses a reduced size image of the object to be measured through a lens system onto the array. By the proper design of the optical system, a reduction in size is obtained that permits the selection of special commercial sensing arrays. The arrays may be selected for economy and for good resolution so as to provide a more compact and better-operating area measuring device. The scanner may also use light applied to the object from the same side as the sensing array, with the sensing array being sensitive to a particular color so as to enable the measurement of a colored area of the object while scanning from one side.

In operation, the tab on one end of the cord in the length measuring system is held at one location on the object to be measured. For example, it may be held near the stalk of the leaf, the area of which is to be measured while the leaf extends through the scanner. The scanner is then pulled across the leaf while the one end of the cord is held stationary so that the length measuring apparatus turns the signal generator to generate signals representing increments of length of the object that is scanned. The signals from the length generating apparatus cause the shift register to read a number of pulses representing the width of the object at each increment of length into the counter. The total of the pulses in the counter therefore represents the area of the object to be scanned.

From the above description, it can be understood that the area measuring apparatus and method of this invention has several advantages such as: (1) it is able to nondestructively measure the area of objects such as leaves while they are still attached to the stalk; (2) it is light in weight and small in size so as to be portable; (3) it is able to provide measurements of area with high resolution; (4) it is inexpensive because the optical system provides an image which may be adjusted to be suitable for economical sensing arrays; (5) it requires a relatively small amount of power because the light utilized in sensing the width of the object may be pulsed during the sensing operation so that it does not require continuous operation; (6) in one embodiment, it may scan an object from only one side of the object, such as for example scanning rough and irregular objects that cannot be conveniently fed through the scanner (7) it has a good noise rejection characteristics because it utilizes a light source which includes very little infrared light; and (8) it includes an optical system that focuses on the object to be measured thus eliminating diffused light and is conveniently constructed for the insertion of filters to remove further unwanted frequencies of light.

The above noted further objects of the invention will be better understood from the following detailed description when considered with reference to the accompanying drawings in which:

FIG. 4 is a block diagram of the electrical circuitry used in an embodiment of the invention; and FIG. 5 is a simplified perspective view of another embodiment of the invention.

Figure 1:
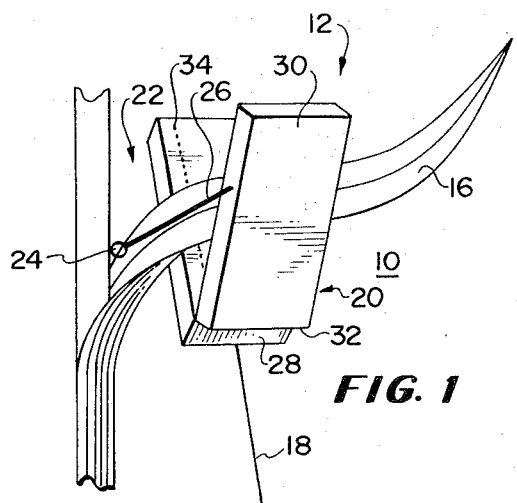
FIG. 1 is a simplified diagramatic view, partly in perspective and partly as a block diagram, of an embodiment of the invention as it is utilized in one application.

In FIG. 1, there is shown a leaf 16 and an automatic area measuring instrument 10 having an incremental area measuring unit 12 and counter and control circuitry 14 with the leaf 16 being positioned within the incremental area measuring unit 12, the incremental area measuring unit 12 being electrically connected to the counter and control circuitry 14 through a cable 18 of electrical conductors. The incremental area measuring unit 12 includes a scanning section 20 and a stationary single-dimension measuring section 22 having a shank portion 26 with a tab 24 at one end adapted to be positioned in a fixed relationship with respect to the leaf 16 and a shank portion 26 adapted to move into and out of the scanning section 20 at the other end.

To permit the area of a leaf 16 to be measured in the field without detaching the leaf 16 from its stalk, the automatic area measuring unit 12 is portable and easily movable to the field where it can be used to measure the leaf 16 while the leaf is still on its stalk by scanning the leaf with the incremental area measuring unit. The incremental area measuring unit 12 includes suitable apparatus for generating signals, which signals are integrated to provide the area of the stalk 16 as the scanning section 20 is moved with respect to the stalk 16 while the tab 24 of the stationary single-dimension measuring section 22 remains fixed. In the preferred embodiment the area of the leaf 16 is measured by measuring one dimension with the stationary single-dimension measuring section 22 and the other dimension by means of a second measuring apparatus within the scanning section 20 with one of the first and second dimensions being integrated with respect to the other dimension by the method of rectangular approximations.

To measure the first dimension, the stationary single-dimension measuring section 22 generates pulses in proportion to the length of its shank 26 as the tab 24 is held stationary at one end of the leaf 16 and the scanning unit 20 is moved in the direction of the opposite end of the leaf 16, with the second measuring apparatus within the scanning unit 20 being positioned so as to at least cover the ends of the leaf 16 and moving with its long dimension orthogonal to the shank portion of the stationary single-dimension measuring section 22.

The shank portion 26 of the stationary single-dimension unit 22 may be any type of apparatus that is movable with respect to the scanning unit 20. In the preferred embodiment it is a flexible member or cord which is wound on a wheel within the scanning section 20 as the scanning section moves toward the tab 24 and unwound as the scanning section 20 moves away from tab 24. However, it may be a rigid member passing through the scanning section 20 which generates signals by any other method as a portion of it moves with respect to the scanning section 20. Moreover, it is not necessary for the entire stationary single-dimension measuring section 22 to move with respect to the scanning section 20 but only a portion of it may be moved to generate signals which are related to the distance the scanning section 20 moves with respect to the leaf 16. For example, a wheel may be mounted within the scanning section 20 so that the center of rotation of the wheel is stationary in position within the scanning section 20 but the periphery of the wheel moves with respect to the scanning section 20 to generate the necessary signals.

To measure the second dimension of the leaf 16 as the scanning section 20 is moved with respect to tab 24, the scanning section 20 includes an elongated sensing array 34 positioned with its longitudinal axis orthogonal to the direction of motion of the scanning section 20 with respect to the tab 24 as the scanning section 20 is moved away from the tab 24 and the stalk of the leaf 16. The elongated sensing array 34 measures the second dimension of the leaf 16 at locations determined by the single-dimension measuring unit 22 as the scanning section 20 moves from the tab 24 which dimension is automatically multiplied by the increment of length at each location to provide an incremental unit of area of the leaf 16, which incremental area is the product of the distance that the scanning section 20 has moved in a short period of time times the second dimension.

In the preferred embodiment the single-dimension measuring section 22 generates a signal which represents one unit of length each time that the incremental area signal is to be provided so that the incremental area signal represents one increment length multiplied by the number of units provided by the elongated sensing array. With this mechanization no multiplication is necessary since the product always is one times the number generated by the elongated sensing array. However, several increments could be measured each time that the incremental area signal is generated in which case a multiplying operation would be appropriate to calculate the incremental area.

In the preferred embodiment, the scanning section 20 includes a base portion 28 and a cover 30. The cover 30 includes within it a source of light such as an array of light emitting diodes, the power for which is supplied through the electrical cable 18 through a conductor separate from the conductor that applies signals to the counter and control circuit 14. The cover 30 is hinged to the base 28 at 32 so that the leaf 16 may be positioned between the base 28 and the cover 30 with light from the light emitting diodes impinging against the leaf 16 and the top surface of the base 28 where the leaf does not cover the base. The base 28 includes the elongated sensing array 34 which in the embodiment of FIG. 1 is a single line of photocells which generate different signals depending on whether the leaf 16 covers them or does not cover them as the scanning section 20 moves with respect to the tab 24.

Figure 6:
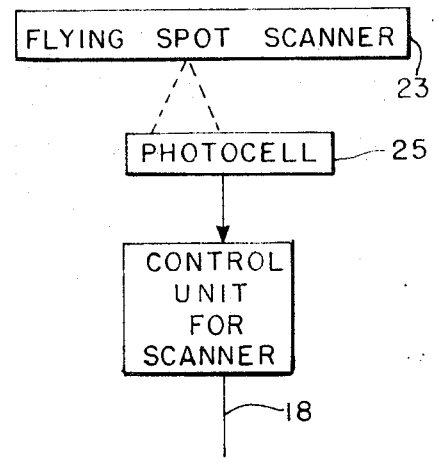
FIG. 6 is a block diagram of a portion of another embodiment of the invention.

While the elongated sensing array 34 is a single line of photocells the embodiment of FIG. 1, other arrangements may be used to generate signals representing the width of the leaf 16 across each incremental area that is to be formed by the product of the signal from the stationary single-dimension measuring section 22 and the elongated sensing array 34. For example, an imaging system may be positioned within the base 28 to project an image of the width of the leaf upon a smaller sensing array mounted within the base 28. Moreover a flying spot scanner 23 (FIG. 6) cooperating with a single photocell 25 may be substituted for the array of photodiodes and elongated beam of light used in the preferred embodiment. Of course other width measuring devices may be used such as pressure or moisture sensing devices or the like.

While in FIG. 1 the automatic area measuring unit 10 is shown measuring a leaf 16, it may be used to measure any other type of relatively flat object to be determined the area thereof. While virtually any type of relatively flat object can be measured with the automatic area measuring instrument 10, the automatic area measuring instrument 10 has particular utility in measuring objects which should not be moved or removed from a larger object. For example, documents are frequently bound to large volumes and such documents may contain areas that can be measured to indicate certain statistical information such as elevations, rainfall and the like information on maps. The automatic area measuring instrument 10 may be used to measure the areas on a single page of the bound volume without removing the page from the volume. However, under some circumstances, relatively minor modifications are necessary in the scanning section 20 to adapt it for sensing the particular portions of the document. For example, it may be desirable to use a sensing medium other than light on some documents or a light source positioned within the base 28 to reflect light from a page upon a light sensing array, with an appropriate filtering equipment being within the base 28 to cause the sensing array to be responsive only to a particular reflected color.

To accumulate the signals representing incremental areas of the leaf 16 and to provide the necessary control functions for the incremental area measuring unit 12, the counter and control circuitry 14 includes a counter that accumulates the signals from each incremental area measurement and provides a total representing the area of the leaf scanned by the scanning section 20 and a control circuit for reading the incremental area measurements from the scanning section 20 to the counter and control circuit 14 at the end of each increment of length.

In the operation of the automatic area measuring instrument 10, the entire automatic area measuring instrument 10 is generally brought to the location of the object to be measured. For example, it may be carried to a library having volumes, the pages of which are to be scanned so that certain portions of the pages may be measured, or carried to certain plants in a field, the leaves of which are to be measured.

An important use of the automatic area measuring instrument 10 is in the field of plant science. In certain experiments in the field of plant science, it is desireable to measure the area of leaves of plants without removing the leaves from the plants. The automatic area measuring apparatus 10 is especially useful in this application since the scanning section 20 may be moved with respect to the leaf to measure its area without removing the leaf. Of course, it is also useful in other types of nondestructive testing that are analogous to this use in plant science.

When the automatic area measuring instrument 10 has been brought to the location where an object such as a leaf 16 is to be measured, the incremental area measuring unit 12 is positioned with the leaf 16 between the base 28 and the cover 30 while the counter and control circuitry 14 rests nearby such as on the ground, being electrically connected to the incremental measuring unit 12 by the cable 18. With the leaf 16 positioned between the base 28 and the cover 30, the tab 24 of the stationary single-dimension measuring section 22 is held near the stalk at the base of the leaf 16 with the scanning section 20 being positioned adjacent to it so that its trailing edge touches the tab 24.

While the tab 24 is held stationary with respect to the leaf 16, the scanning unit 20 is moved along the leaf, moving in the same direction as the shank 26 of the stationary single-dimension measuring section 22, with the array 34 being parallel to a leading edge of the scanning section 20 and moving in a direction orthoginal to the shank 26 of the stationary single-dimension measuring section 22. While the scanning section is moving, the leaf 16 is held between the cover 30 and the base 28 by a stop which is positioned between the base 28 and the cover 30 at the end opposite to the hinge 32.

While in the preferred embodiment, an accurate measurement is only obtained if the scanning section 20 is moved in such a way that the array 34 is always orthogonal to the shank 26 of the stationary single-dimension measuring section 22, it is obvious that other arrangements may be made in which the shank 26 is moved at an angle to the array. Such arrangements may be incorporate in a computer that adjusts for changes in the angle between the shank 26 and the array 34 or arrangements in which the corrective measurement is obtained only when some constant angle other than 90° is maintained.

As the scanning section 20 moves with respect to the tab 24, the shank 26 moves with respect to a portion of the cover 30. The motion of the shank 26 with respect to the cover 30 generates pulses proportional to the distance moved. In other words, a single pulse is generated within the cover 30 for each increment of distance moved by the scanning section 20 with respect to the tab 24.

As the scanning section 20 is being moved with respect to the tab 24, the elongated measuring array 34 generates signals proportional to the length of the leaf 16 in a direction orthogonal to the shank 26 of the stationary single-dimension measuring section 22. Each time that the scanning section 20 moves one increment of length to cause the stationary single-dimension measuring section 22 to generate one pulse, the longitudinal measuring array 34 generates a signal indicating the dimension of the leaf 16 in a direction orthogonal to the shank 26. At this time, the control unit in the counter and control circuitry 14 causes this signal to be read into the counter for accumulation. Of course, the units of distance that correspond to a signal in both directions of measurement are dimensionally correct for the application of the automatic area measuring instrument.

The counter within the counter and control circuitry 14 stores an accumulated total of all of the incremental areas scanned by the scanning section 20. Accordingly when the scanning section 20 has been pulled the full length of the leaf 16, the counter within the counter and control circuitry 14 has recorded a number representing the total area of the leaf 16.

Of course, any portion of the leaf 16 may be measured rather than the entire leaf by holding the tab 24 at a selected position and moving the scanning section 20 over the portion of the leaf that is to be measured. Moreover, the total area of several leaves may be measured and this total area accumulated within the counter of the counter and control circuitry 14 by measuring the area of each leaf separately while permitting the accumulated total from previous measurements to remain in the counter.

Figure 2:
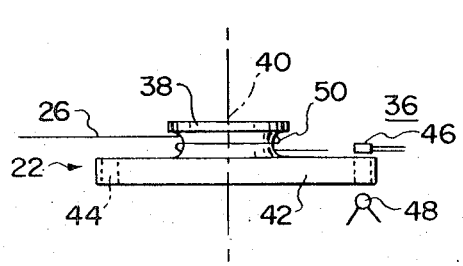
FIG. 2 is a plan view of a portion of an embodiment of the invention.

In FIG. 2, there is shown a signal generating apparatus 36 which is a portion of the stationary single-dimension measuring section 22. The signal generating apparatus 36 includes a chopper wheel 38 having a center of rotation 40 about which a flat disc 42 rotates. A plurality of light apertures 44 are spaced around the outer periphery of the of the disc 42 forming a closed circle, with a photocell 46 being mounted on one side of the disc 42 and a source of light 48 being mounted on the opposite side in line with the circle so that as the apertures 44 are rotated about the center of rotation 40, the light from the source of light 48 shines through one aperture at a time onto the photocell 46 to cause the photocell to generate a pulse each time that the chopper wheel rotates through the angle between two successive apertures. The shank 26 is wound around a reduced diameter pulley section 50 of the chopper wheel 38 so that, as the shank portion 26 moves with respect to the center of rotation 40 within the scanning section 20, the chopper wheel 38 is rotated so that the photocell 46 emits one pulse for each increment of motion of the scanning section 20 with respect to the tab 24 (FIG. 1).

Figure 3:
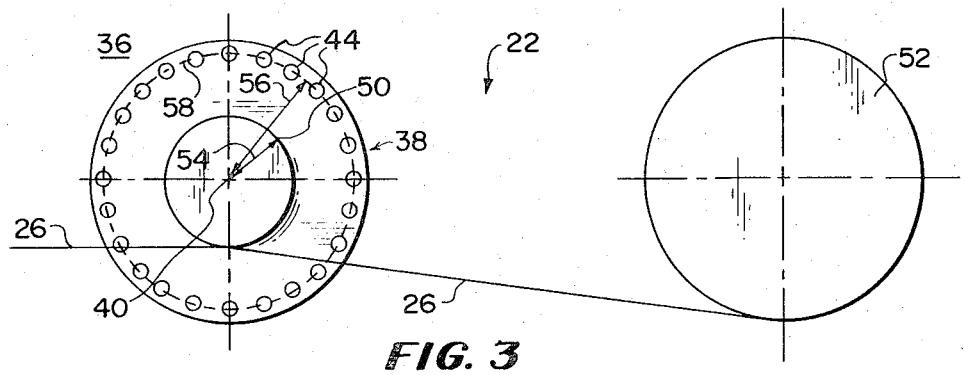
FIG. 3 is a side view of a portion of an embodiment of the invention.

In FIG. 3 there is shown an elevational fragmentary view of a portion of a stationary single-dimension measuring unit 22 including the shank portion 26, the chopper wheel 38, and the take-up reel 52. The shank portion 26 is wound into the takeup reel 52 which is biased to retract it as the scanning section 20 moves toward the tab 24.

As best shown in FIG. 3, the shank 26 is wound around the reduced diameter pulley section 50 so that as the shank portion 26 moves with respect to the scanning section 20, the chopper wheel 38 is rotated to move successive ones of the apertures 44 between the source of light 48 and the photocell 46 (FIG. 2). The ratio of the radius 54 of the pulley section 50 to the radius 56 of the circle 58 passing through the apertures 44 determines the ratio between the velocity of the scanning section 20 to the tangential velocity of the apertures 44 as they pass between the source of light 48 and the photocell 46. By selecting this ratio and the number of apertures within the circle 58, the number of pulses that are generated by the photocell 46 for each unit length of motion of the scanner 20 with respect to the tab 24 is controlled. This number of pulses may be selected to correspond to the units of measurement desired and to the precision desired in measuring the area. The spacing between the photocells of the longitudinal measuring array 36 (FIG. 1) is also adjustable to control the selection of the proper dimensions and the resolution of the area measurements.

In FIG. 4 there is shown a block diagram of the electronic system incorporated in the incremental area measuring unit 12 and in the counter and control circuitry 14, with the incremental area measuring unit 12 and the counter and control circuitry 14 being electrically connected by the conductors 18A–18D within the cable 18 (FIG. 1). The incremental area measuring unit 12 includes the stationary single-dimension measuring section 22 and the scanning section 20.

To generate signals representing the increments of length scanned by the scanning section 20, the single-dimension measuring section 22 includes the cord 26 with the tab 24 on one end and a length increment encoder 37 on the other end. The length increment encoder includes the signal generator 36 shown in FIG. 3 and is located within the scanning section 20. The scanning section 20 includes the photodiode array 34, a shift register 55 and a reset switch 57, with the photodiodes in the diode array 34 each being electrically connected to a different stage of the shift register 55.

The control and counter circuitry 14 includes a control unit 59, an AND gate 60 and a read-out counter 62, with the AND gate 60 having one of its two inputs electrically connected to one output of the control unit 59 through a conductor 64 and the other of its inputs electrically connected to the shift register 55, the output of the AND gate 60 being connected to the read-out counter 62.

To read pulses generated by the photodiode array 34 from the shift register 55 representing the width of the object at an increment of length, the control unit is connected to the length increment encoder 37 through a conductor 18A to receive pulses indicating the increments of length and connected to the shift register through a conductor 18B to provide signals to the shift register 55 reading the pulses from the shift register through the gate 60 which is opened at this time and into the read-out counter 62. The pulses are read from the shift counter to the AND gate 60 through conductor 18C by pulses from a multivibrator within the control unit 58 which pulses are applied to the shift counter 54 through the conductor 18B. These pulses are read through the AND gate 60 through the conductor 64 into the readout counter 62. The reset switch 57 is connected to the read-out counter 62 through the conductor 18D to control the resetting of the counter so as to control the portions of an object or the number of objects that are to have their area accumulated in the read-out counter 62.

In the operation of the circuitry shown in FIGS. 2, 3 and 4, single line measurements of width represented by a number of pulses from readout of a line of photocells are controlled by the incremental distance as the scanner 20 moves across the length of the object to be measured. For this purpose, the length increment encoder 37 includes the chopper wheel 38 which generates pulses in proportion to the length that the scanner is moved with respect to the leaf 16. These pulses are applied to the control unit 59 through the conductor 18A as the scanner 20 is moved along the length of the leaf 16. In response to the pulses from the length increment encoder, a control unit 59 causes a number of pulses to be read to the readout counter that is proportional to a line across the width of the leaf 16.

In the preferred embodiment the pulses representing the width are generated by a photodiode array extending across the scanning area of the scanning section. However, it is possible to utilize a single photocell and a flying spot scanner rather than an array of photocells. To accomplish this, the flying spot scanner scans across the width of the leaf, and while it scans across the leaf, a sensor causes a number of clock pulses to be generated representing the width of the leaf. When using a flying spot scanner the width of the leaf is multiplied by a single increment of length.

The pulses generated by the length increment encoder 37 are applied to the control unit 59 which generates a square wave pulse and applies it to the AND gate 60 through the conductor 64. This pulse occurs between pulses generated by the length increment encoder 37 as the apertures rotate between the source of light 48 and the photocell 46. Each pulse applied to the conductor 64 therefore represents one increment of distance between tab 24 and scanner 20.

While the AND gate 60 is held open by a pulse applied to the conductor 64, the control unit 59 applies a sufficient number of pulses, (which in the preferred embodiment is 128) to the conductor 18B to read-out the shift counter 54 through the conductor 18C and to open AND gate 60 so as to pass pulses to the read-out counter 62. The shift register 55 stores pulses generated by photodiodes in the photodiode array of 34 which do not receive light. Accordingly, the number of pulses read from the shift counter 54 is proportional to the width of the leaf or other object being scanned.

When an area increment is completed, whether it is for a portion of a leaf, a full leaf, or several leaves, a reading is taken from the read-out counter 62 and the reset button 56 is depressed to reset the entire circuit.

In FIG. 5, there is shown another embodiment 66 of scanning section usable with the incremental area measuring device 10. In the embodiment of scanning section 66, an optical system is utilized to form a reduced size image of the width to be measured, thereby permitting a reduction in the size of the scanner so as to render it more portable and easier to use. When an array of sensing units is utilized as in the preferred embodiment of this invention, small components may be in the array to perform the scanning operation and when a flying spot scanner is used with a single sensing device, the flying spot scanner may be smaller because the distance of the scan is less when this optial system is used. Under both of these circumstances the scanning section itself is reduced in size, and under some circumstances, reduced in cost.

In FIG. 5, the scanning section 66 is shown with the cover 68 positioned on the bottom and the base broken away to expose the optical system 70 and the array of photodiodes 72. A light source 74 is positioned in the cover to transmit light to the leaf 16, which light source, in the preferred embodiment, includes a plurality of light emitting diodes (LED), which are gallium arsenide phosphide diodes. These diodes emit light predominately of a red frequency, which light is absorbed readily by leaves. By using an LED light source, only relatively low power is necessary and to obtain adequate contrast between the leaf and the background thus reducing the size and weight of the scanner 66.

In the preferred embodiment, the amount of power required is further reduced by pulsing the LED light source when the array 72 is to be read. This enables the LED source to be off at other times thus conserving power. Other types of light sources such as incandescent lamps can be used, but since they normally operate continuously, more power is required for the continuous operation thus requiring a heavier area measuring instrument. Moreover, other types of lamps such as incandescent lamps transmit frequencies of light which are transmitted readily by leaves and are difficult to filter from the apparatus. Accordingly, the contrast of the system is better when an LED light source is used than when an incandescent light source is used.

A further advantage of the optical system 70 is that it may be focused directly on the leaf 16. Because the optical system is focused on the leaf 16, diffused light is not transmitted as readily through the optical system to the array 72 thus increasing the contrast and noise rejection of the system.

The optical system 70 includes: (1) a slit 76 extending longitudinally across the width of the leaf 16 to pass light on opposite sides of the leaf across its width and to block diffused light; (2) a first mirror 78 above and and above the slot 76 and at an 45° angle with the top surface of the leaf 16 so as to form an upright image behind the mirror 78; (3) a second mirror 80 which is orthoginal to the top surface containing the slit 76 and at an angle with the first mirror 78; and (4) a lens system 82 having its longitudinal axis in line with the sensing array 72 and at an angle with the second mirror 80. The first mirror 78 and the second mirror 80 are first surfaced mirrors so as to avoid errors caused by refraction.

The first image of the line across the width 16 that passes through the line slit 76 is formed behind the mirror 78 the same distance as the surface of the mirror 78 is above the top surface of the leaf 16. The second image is formed behind the second mirror 80 a distance which is proportional to the angle between the second mirror 80 and the first mirror 78 so that by increasing the angle between the first and second mirrors the image may be projected further behind the second mirror 80. This angle is adjusted until the image is a sufficient distance behind the second mirror 80 so that ratio of the object distance to the lens image distance is the desired reduction factor. In the preferred embodiment this reduction factor is 20 to 1 so that a 5 inch wide leaf is reduced to an image of one quarter inch. This angle is also selected so that the position of the lens system 82 in focusing upon the second image is not an excessive angle to decrease the bulk of the scanner 66.

Although a specific mirror system is shown in FIG. 5, it it obvious that other types of optical systems may be used for the same purpose, the general purpose being to reduce the size of the image and to position it in such a way as to make the scanning section less bulky.

In the operation of the scanning section 66, the tab 24 is positioned at the base of the leaf 16 and adjacent to the side of the scanning section 66. With the tab 24 held stationary, the scanning section 66 is pulled over the leaf 16 so that the tab 24 moves relative to the scanning section 66 as the scanning section 66 moves over the leaf 16. Within the scanning section 66, the leaf 16 is held at a fixed location by a pressure flap so as to maintain its optical distance from the lens system constant, thus avoiding errors due to changes in the image reduction ratio.

As the scanning section 66 moves over the leaf 16, light from the LED light source 74 shines through the slit 76 wherever it is not covered by the leaf 16. This forms a moving line image the width of the leaf 16 as the scanner 76 moves away from the tab 24.

The moving line image is projected behind the fist mirror 78 by the same distance that the surface of the mirror is away from the top surface of the leaf 16. This image is received by the mirror 80 and projected behind this mirror by a sufficient distance to provide the proper image reduction on the array 72 after passing through the lens system 82 which is focused on the image. This image reduction in the preferred embodiment is 20 to 1 so that a 5 inch wide leaf is reduced to one quarter of an inch on the sensing array 72.

While in the preferred embodiment the reduction ratio of 20 to 1 is provided, it is to be understood that other reduction ratios are easily obtained by adjusting the arrangement of mirrors and lens. Because the reduction ratio is adjustable, the array 72 may be selected from a wide variety of different commercial arrays of different sizes. Because of this adaptabilty, optimum size arrays have been selected which reduce the bulk of the scanner 66. The reduction in size also improves the resolution by enabling the use of integrated circuit packages having a larger number of photocells for the same size leaf that is to be scanned.

Moreover, because the lens 82 has a relatively small entrance aperture, it is relatively easy to mount filters in front of it when desired. For example, under some circumstances, filters may be used to filter out infrared light.

Although a preferred embodiment has been described in some particularity, it is to be understood that many variations are possible in the preferred embodiment without deviating from the invention. Therefore, it is to be understood that, within the scope of the appended claims, the invention may be practiced otherwise than as specifically described.

What is claimed is:

1. A method of measuring the area of a substantially stationary object with a portable instrument having at least first and second portions movable with respect to each other without moving the object to a new location comprising the steps of:

bringing the portable measuring instrument to the location where the stationary object to be measured is located;

establishing a reference location with respect to the object by placing at least one part of said first portion of the measuring instrument at a position that is stationary with respect to the object;

moving at least one part of the second portion with respect to the object while the part of the first portion is stationary with respect to the object and said object remains substantially stationary;

sensing the distance the part of the second portion moves with respect to the part of the first portion and a dimension of the object that is transverse to the direction of motion of the part of the second portion;

generating at least a first signal related to the distance moved by the part of the second portion and the dimension transverse to the direction moved; and obtaining a second signal representing the area of said object from said first signal.

2. A method according to claim 1 in which:
the step of generating said first signal includes the steps of generating a third signal which is independent of the rate of motion of said part of said second portion with respect to said part of said first portion and dependent on the distance said part of said second portion moves with respect to said part of said first portion, and generating a fourth signal representing said dimension transverse to the direction moved; and
the step of obtaining said second signal includes the step of obtaining said second signal from said third and fourth signals.

3. A method according to claim 2 in which the step of obtaining said second signal representing the area of said object includes the step of periodically multiplying increments of said third signal by said fourth signal to obtain the integral of one of said third and fourth signals with respect to the other of said third and fourth signals.

4. A method according to claim 2 in which:
said step of generating a third signal which is independent of the rate of scanning includes the step of generating a plurality of different first-dimension increment signals each representing one increment of said distance;
said step of generating a fourth signal representing a dimension transverse to said direction of motion at a plurality of locations along the object includes the step of generating a plurality of different second-dimension sets of signals with each set of signals being proportional to said dimension transverse to said direction of motion at the location of a different one of said increments of said distance moved; and
said step of obtainng the second signal includes the steps of adding each of the second-dimension sets of signals, with the first-dimension increment signals and second-dimension sets of signals being dimensionally adjusted so that when the second-dimension sets of signals are added, they represent the sum of the products of each increment in the direction of motion and the second-dimension set of signals corresponding to that increment, whereby said sum represents the area of the object that is scanned.

5. A method according to claim 4 further comprising the steps of:
forming an image of said dimension transverse to said direction of motion as said part of said second portion is moved with respect to said part of said first portion; and
reducing said image in size;
said step of generating said fourth signal comprising the step of generating a signal that is proportional to the size of said reduced image.

6. A method according to claim 2 in which the step of generating a fourth signal comprises the step of:
transmitting light through an elongated slit extending in the direction of said dimension transverse to said direction of motion, and aligned with said object to form a line image; and
projecting said image upon a light sensing array.

7. A method according to claim 2 in which the step of generating a fourth signal comprises the step of:

scanning the object in a direction transverse to said direction of motion with a flying spot to form a modulated beam of light; and
sensing said modulated beam of light with at least one light sensitive element.

8. Apparatus for measuring the area of a substantially stationary object, comprising:
a portable measuring instrument;
said portable measuring instrument including first and second portions movable with respect to each other;
said first portion including a part adapted to be positioned at a fixed location with respect to said substantially stationary object, whereby a reference location on said object is established;
said second portion including a signal generating means for generating at least a first signal when said second portion is moved with respect to said part of said first portion while said object is substantially stationary in such a manner that said first signal is independent of the rate of moving said second portion with respect to said part of said first portion and related to a function of the distance between said part of said first portion and said second portion and a dimension of said object in a direction transverse to the direction of motion of said second portion with respect to said part; and
calculator means for obtaining a second signal from said first signal representing the area of said object across which said second portion has moved.

9. Apparatus according to claim 8 in which:
said signal generating means includes first-dimension signal generating means for generating a third signal when said second portion is at different locations with respect to said first portion in such a manner that said third signal is independent of the rate of moving said second portion with respect to said first portion and second-dimension signal generating means for generating a fourth signal representing said dimension of said object in said direction transverse to said direction of motion; and
said calculator means includes means for obtaining a second signal representing the area of said object from said third and fourth signals.

10. Apparatus according to claim 9 in which:
one of said third and fourth signals is a length signal and the other is a width signal;
said first-dimension signal generating means includes means for generating one of a different length signal and a different width signal at each of certain predetermined increments of motion;
said second-dimension signal generating means includes means for generating the other of a different length signal and a different width signal at each of said certain predetermined increments; and
said calculator means includes means for adding the product of the width and length signals at each of aid increments to provide an integral of one of said dimensions with respect to the other.

11. Apparatus according to claim 10 in which:
said means for generating one of a different length signal and different width signal includes means for generating one pulse at each dimensional unit of motion of said second portion with respect to said part of said first portion;
said means for generating the other of a different length signal and different width signal includes means for generating a number of pulses equal to the dimension transverse to the direction of motion in the same dimensional system as said dimensional unit of motion; and said calculator means is an accumulator for adding the pulses of said means for generating the other of a different length signal and different width signal.

12. Apparatus according to claim 11 in which:

said first portion includes an elongated member;

said part of said first portion comprises one end of said elongated member; and said first-dimension signal generating means includes at least a portion of said elongated member and means cooperating with said elongated member to generate pulses as said elongated member moves within the said second portion.

13. Apparatus according to claim 12 in which said second-dimension signal generating means includes:

a source of light;

means for directing light from said source of light against said object; and light sensitive means for generating a number of electrical pulses proportional to the dimension transverse to the direction of motion at said dimensional units in response to the effect of said object of said light.

14. Apparatus according to claim 13 in which said means for directing light comprises a flying spot scanner.

15. Apparatus according to claim 13 in which:

said means for directing light comprises a surface which is opaque to at least one frequency of light positioned between said source of light and said light sensitive means;

said surface having internal walls defining a slit that transmits said one frequency of light extending in the direction of said dimension transverse to said motion;

said slit being sufficiently long to extend beyond the edges of the object; and said surface being connected for movement with said second portion.

16. Apparatus according to claim 12 in which said source of light comprises light-emitting diodes.

* * * * *